United States Patent [19]

Powell et al.

[11] 4,161,202

[45] Jul. 17, 1979

[54] PUNCTURE SEALING TIRE

[75] Inventors: Joe A. Powell, Norton; James W. Messerly, Stow; Ronald L. Shippy, Brunswick, all of Ohio

[73] Assignee: The B. F. Goodrich Company, Akron, Ohio

[21] Appl. No.: 370,656

[22] Filed: Jun. 18, 1973

[51] Int. Cl.² ............................................. B60C 19/12
[52] U.S. Cl. ................................................. 152/347
[58] Field of Search ............... 152/346, 347, 310, 311, 152/323; 156/115

[56] References Cited

U.S. PATENT DOCUMENTS

| | | | |
|---|---|---|---|
| 2,752,979 | 7/1956 | Knill et al. | 152/347 |
| 2,765,018 | 10/1956 | Connell | 152/347 |
| 2,827,098 | 3/1958 | Semegen et al. | 152/347 |
| 3,100,518 | 8/1963 | Dresser | 152/347 |

*Primary Examiner*—Joseph F. Peters, Jr.
*Assistant Examiner*—D. W. Underwood
*Attorney, Agent, or Firm*—Joe A. Powell

[57] ABSTRACT

A puncture sealing tire has an inner layer consisting of closed cell cellular rubber, in direct contact with the inflation gas. The inner layer is preferably coated with a solid fluent material capable of flowing into punctures at operating temperatures.

2 Claims, 1 Drawing Figure

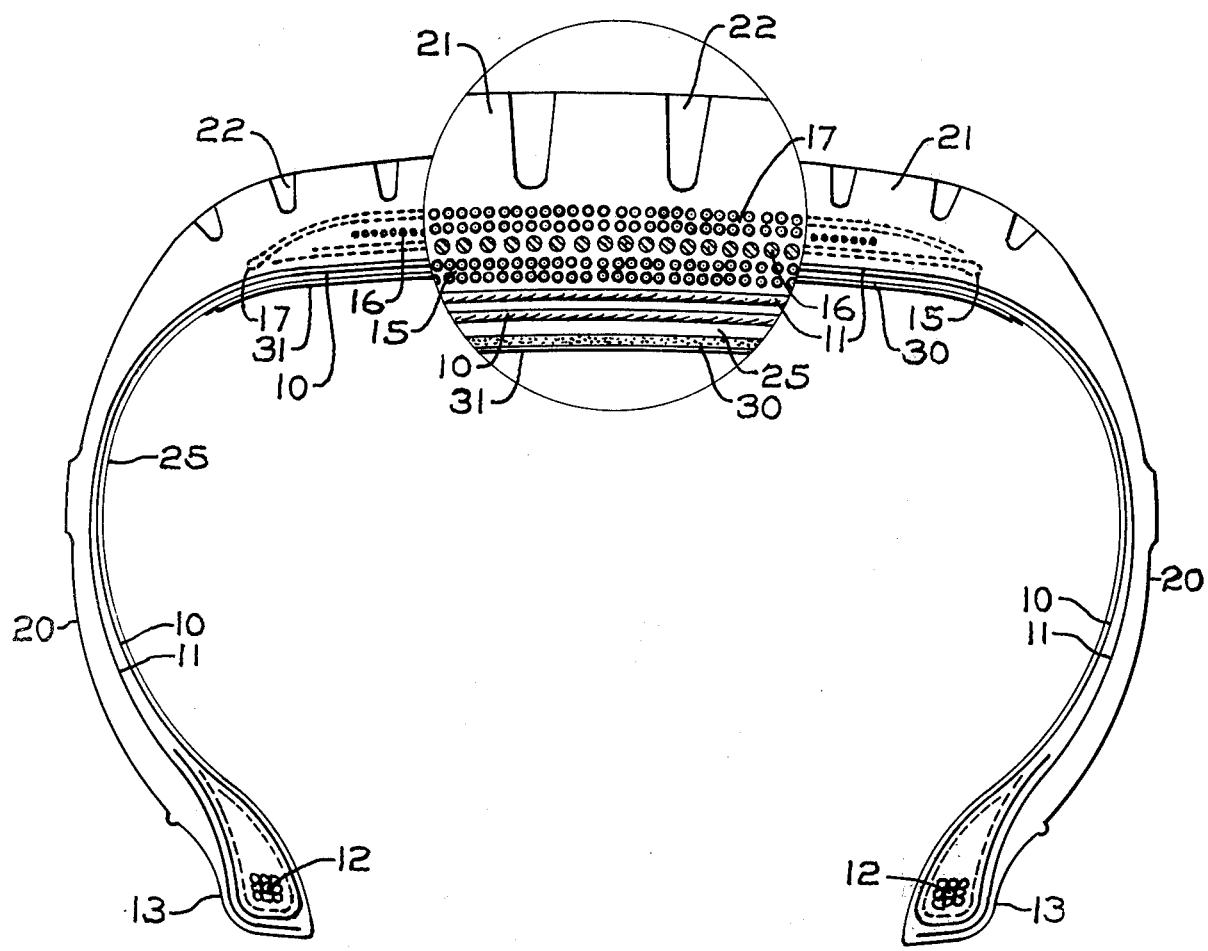

PUNCTURE SEALING TIRE

BACKGROUND

A principal hazard of use of pneumatic tires has always been punctures by sharp objects such as nails or splinters of glass. Of the many proposals for sealing punctures, the most successful have been sticky materials on the inside of tires, but they have been difficult to handle in the manufacture of tires and their expense has appeared to be greater than the benefits would justify. Layers of sponge or cellular rubber have also been proposed but seem never to have gone into practical use, perhaps because the proponents did not understand the conditions required for sealing with such materials and consequently could not obtain satisfactory results.

SUMMARY OF THE INVENTION

We have discovered that satisfactory and reliable sealing of simple punctures is obtained by bonding to the gas-retaining layer (the liner, in the case of a tubeless tire) an additional thin layer of cellular rubber preferably containing nitrogen gas in its closed cells. This additional layer is prepared as a calendered thin sheet of rubber containing a nitrogen-generating blowing agent, and is laminated to the liner so that the additional layer is the innermost exposed layer of the tire, exposed to the inflation gas. When the tire is vulcanized, the blowing agent is decomposed by the heat, liberating nitrogen. When the pressure on the tire in the vulcanizer is released, the nitrogen expands and puffs the rubber to establish a layer of cellular rubber with closed cells containing nitrogen under pressure.

When such a tire is mounted and inflated (usually by compressed air which is four-fifths nitrogen, but sometimes by commercially pure nitrogen) the gas pressure on the inner layer partially collapses the cells, but in the course of some days time the diffusion of gas through the thin cell walls equalizes the pressure, first in the cells closest to the surface and ultimately in all of the cells, and the cell walls return approximately to the shape which they had at completion of vulcanization and initial expansion. Consequently the gas pressure in the cells under operating conditions is never less than the inflation pressure.

When such a tire is punctured, the puncture is a channel for escape of inflation gas to the atmosphere. To the extent that communication with the atmosphere is actually established, atmospheric pressure will exist in the channel, or at least a pressure lower than the inflation pressure, so that the compressed gas in the cells closest to the puncture can expand toward the puncture, ballooning the cell walls, and tending to seal the puncture.

It is preferred to coat the exposed surface of the cellular rubber layer on the inside of the tire with a flexible material which is capable of flowing or being squeezed into a puncture under the heat of operation of a tire, but not capable of displacement which would unbalance the tire under ordinary operating conditions. A presently preferred material for this purpose is a soft ethylene polymer of low molecular weight, on the order of 2000. Punctures which are only partially closed by the cellular rubber alone will tend to be closed effectively by the combination of the cellular rubber and this coating.

THE DRAWING

The accompanying drawing is a diagrammatic cross section of a typical tubeless passenger car tire embodying this invention, with a portion of the section enlarged to show the novel cellular rubber layer and coating.

DETAILED DESCRIPTION

This invention can be used in any kind or size of pneumatic tire, but since a constantly increasing proportion of tires is being made with radial cord carcasses, the invention is illustrated in connection with a radial cord, tubeless, passenger car tire.

Pneumatic tires generally consist of a flexible cord carcass or body to resist the pressure of the inflation gas, terminated at each side edge by a bead which engages the rim of a wheel. The cords are embedded in rubber, and are protected from abrasion by tread and sidewall rubber, and are made to hold air by a separate inner tube or an integral essentially impervious liner.

In the drawing, two plies of carcass cords 10 and 11, which may be high tenacity rayon or polyester, or other suitable material, lie with the individual rubberized cords essentially in radial planes. The edges of the plies are suitably wrapped around inextensible bead grommets 12 forming part of molded beads 13 shaped for engagement with a standard rim.

The radial cord plies 10 and 11 in the crown of the tire, which is the region of the tire capable of engaging the road, are surrounded by a circumferential belt, which in this instance is shown as consisting of two strips of longitudinally folded organic cord fabric 15 and 17 which may be of the same material as the carcass cords, and one strip between them of steel cords 16 or other material of similar low extensibility. The organic cord belt plies 15 and 17 are preferably prepared with the cords at an angle to the central plane such that their angle in the finished tire will be about 15° to 25° to the central plane, and because of the fold each strip forms a pair of plies with the cords crossing at opposite angles to the central plane. The steel cord belt ply 16 preferably has the cords at an angle to the central plane of 20° to 30°, in the direction opposite to that of the outermost fold of the strip 17, although it may be so arranged that each layer of the belt has its cords in a direction opposite to that of each adjacent belt layer.

A protective layer of rubber completely surrounds the tire, being composed of a moderate thickness of sidewall rubber 20 in the zones where intense flexing occurs, and a thick layer of tread rubber 21 for resisting road wear and having a suitable nonskid pattern 22 of slits, slots, grooves and the like.

On the inner face of the tire is a liner 25 composed of a rubber material having a high resistance to diffusion of nitrogen such as butyl rubber or chlorinated butyl, and extending from one bead 13 to the other bead so as to seal against the rim and minimize loss of inflation gas or its penetration into the body of the tire.

The tire as described above was known before this invention.

In accordance with this invention, an additional layer of closed cell cellular rubber 30 is placed inside of the tire, at least across the entire crown portion of the tire, that is, under the entire tread where punctures are most likely to occur.

In addition, a further thin layer of low molecular weight polyethylene 31 or similar easily fusible solid flexible material is preferably applied to the cellular rubber 30.

In the manufacture of the tires of this invention, few changes from previous practices and procedures are required. The tires can be of any desired type or construction, of which the foregoing is only one example.

The tires can be manufactured with ordinary equipment without alteration, and with only a slight increase in raw materials and labor costs.

The principal change from ordinary practice is to place a sheet of expandable rubber, containing a nitrogen releasing blowing agent, directly on the building drum to form the innermost layer of at least the crown portion of the tire. This expandable rubber must be compatible with the next layer, which is the impervious liner, so that they will adhere and will undergo vulcanization under the same conditions. Moreover, the blowing agent must be so chosen that it will liberate the desired quantity of nitrogen gas at the vulcanization temperature.

In the tire illustrated, and described above, a conventional liner of about two mm. thickness is used, consisting primarily of diffusion resistant olefine polymer rubber, such as a blend of about 50 parts by weight of chlorinated butyl rubber and 56 parts of reclaimed butyl rubber of about 50% rubber content with 22 parts of other hydrocarbon polymer rubbers, together with 50 parts of thermal carbon black, 16 parts of softening oil, 2 parts of tackifying resin, 0.5 parts of fatty acid, 5 parts of zinc oxide, 0.25 parts sulfur (either as free sulfur or the sulfur content of a sulfur donor), and vulcanization accelerators which will bring about vulcanization under the conditions stated below. This liner composition adheres firmly to the usual cord ply coating compositions, both during the tire building operation and after vulcanization.

The cellular rubber composition is built into the tire as the innermost layer, as a sheet of approximately the same thickness as the impervious liner. Thus, with a two mm. liner the sheet of material which is to be expanded to become cellular rubber may have an original thickness, before expansion, either less or greater than the liner thickness, but preferably slightly greater in the range of two and a half to three mm. for best sealing of simple punctures, without significant increase in total cost.

The cellular rubber composition is made from generally the same constituents as the liner with modifications to facilitate expansion to a well vulcanized product of several times its original volume. Specifically, 32 parts by weight of polyisoprene, 42 parts of chlorinated butyl rubber, and 52 parts of reclaimed butyl rubber of about 50% rubber content are mixed, together with about 50 to 80 parts of mineral filler (depending on density), 17 parts of general purpose furnace black, 15 parts of softener oil, 2 parts of fatty acid, 5 parts of zinc oxide, 2 parts of tackifying resin, 0.22 parts sulfur (as free sulfur or in a sulfur donor), with vulcanization accelerators which will bring about vulcanization under the conditions stated below, and 6 parts of azobisformamide masterbatched with 2 parts of rubber.

The azobisformamide is a commercially available blowing agent which decomposes, releasing nitrogen gas, at temperatures in the range from about 160° to 200° C.

In the process of manufacturing the puncture sealing tire, the sheet of cellular rubber composition 30 (in its unexpanded condition) about two and a half mm. thick and of a width to extend under the crown of the tire for a width at least equal to the tread width, is placed centrally on the tire building drum and its ends are joined. The liner 25 in a width which will cover the entire inner surface of the tire from bead to bead is then placed over the cellular rubber layer, followed by the radial cord plies 10 and 11 and the usual elements of the bead construction 12 and 13, with the margins of the cord plies wrapped around the bead grommets 12 in the usual way. From this stage on, the tire can be completed by any conventional procedure, depending on the choice of belt cord angles and on equipment available — for example, either the one-stage process in which the belt plies 15, 16, 17 are successively placed over the radial cord body, followed by the sidewall rubber 20 and tread rubber 21, with expansion of the green tire to the toroidal shape in the vulcanizing press; or the two-stage process in which the belt plies 15, 16, 17 are separately assembled (either with or without sidewall 20 and tread 21), and the radial cord body is expanded into the belt as a separate operation (immediately followed by application of sidewall 20 and tread 21 if not already present) before placement in the vulcanizing press.

If a different type of tire such as a bias cord tire is being manufactured, the components other than the liner and the cellular rubber layer will be slightly different, as will be understood, but the general procedure will be essentially the same.

The compositions described above are designed for vulcanization in a press in which an internal bladder containing steam under pressure at about 185° C. forces the tire against a mold heated to about 170° C. for about 18 minutes. At conclusion of the vulcanization the pressure is released by venting the steam from the bladder, whereupon the cellular rubber immediately expands to several times its original volume, and the completed tire is removed from the mold.

It is preferred to give the tire an internal coating over the entire exposed surface of the cellular rubber, of a solid, fluent polyethylene of melting point about 78° C., and molecular weight about 2000. This material has the consistency of a stiff grease which will not liquefy and flow to the bottom of the tire but will penetrate voids such as punctures under the influence of inflation pressure. This can be brushed or sprayed on in a molten condition in a quantity to supply a uniform film thickness of not over about one-half mm., or about 200g. for a medium size tire of 15 inch bead diameter. Other materials of similar physical properties may be substituted, such as low molecular weight polyisobutylene for example.

It is well known that conditions of vulcanization must be properly correlated with the temperature of decomposition of the blowing agent, for production of closed cell cellular rubber. If the rubber is too soft, or has not started to vulcanize when the gas is released, the cell walls will rupture and an ordinary sponge, useless for the purpose of this invention, will be produced. On the other hand, if vulcanization is too far advanced when the gas is released, the rubber will be so stiff that the gas will be unable to expand it, or will expand it only to a limited and variable degree. Accordingly, for larger size tires with heavier walls, which are vulcanized at lower temperatures for longer times so as to achieve a reasonable uniformity of cure at the end of the vulcanization time, a blowing agent decomposing at a lower temperature should be chosen, such as dinitrosopentamethylenetetramine decomposing at 130° to 190° C. or oxybisbenzenesulfonyl hydrazide decomposing at 120°-140° C.

Numerous tests, in which the tires of this invention have been punctured by nails or spikes, have shown the tires of this invention to be almost completely effective in sealing punctures. The sealing of punctures is most certain and the loss of air is least if the tires are punctured while in use and while the vehicle is continued in operation.

We claim:

1. A puncture sealing tubeless tire having a carcass with a tread over the road-engaging portion of the carcass and an air impervious liner bonded to the inner face of the carcass, characterized by additional presence of a thin sheet of closed cell cellular rubber with its cells filled with a gas under pressure which is mainly nitrogen, which sheet is bonded to the inner face of the liner over at least the portion opposite to the tread, and wherein the cellular rubber is coated with a solid fluent material capable of flowing into punctures under operating conditions.

2. A puncture sealing tire as in claim 1 in which the cellular rubber is coated with a low-melting waxy polyethylene.

* * * * *